G. C. BROWNLESS.
MEASURING MACHINE.
APPLICATION FILED JULY 2, 1910.
1,032,736.
Patented July 16, 1912.
2 SHEETS—SHEET 1.
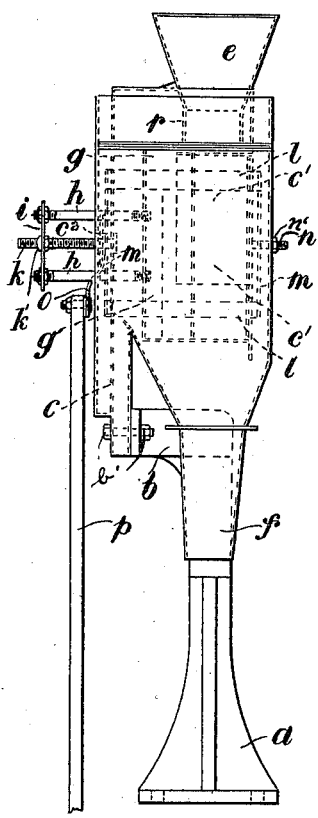
Fig. 1.
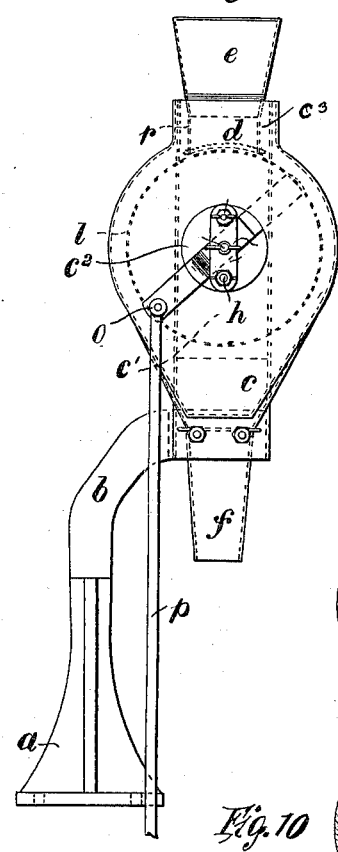
Fig. 2. Fig. 3ª Fig. 3.
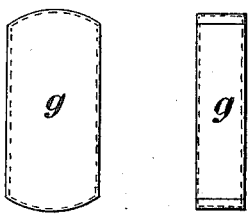
Fig. 8 Fig. 9
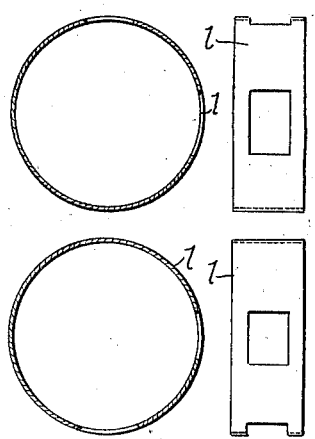
Fig. 10
Fig. 4 Fig. 5. Fig. 6. Fig. 11
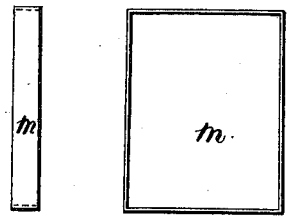
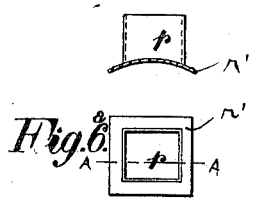
Witnesses.
Howard F. Costello
Inventor
George C Brownless
By E. E. Vrooman,
Attorney.
COLUMBIA PLANOGRAPH CO., WASHINGTON, D. C.

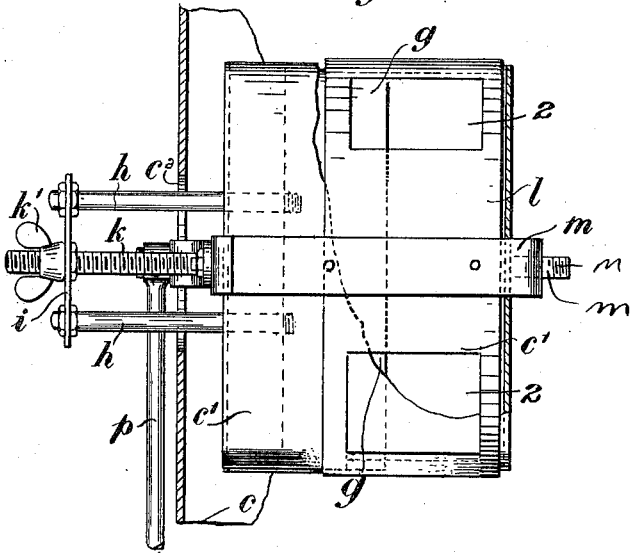
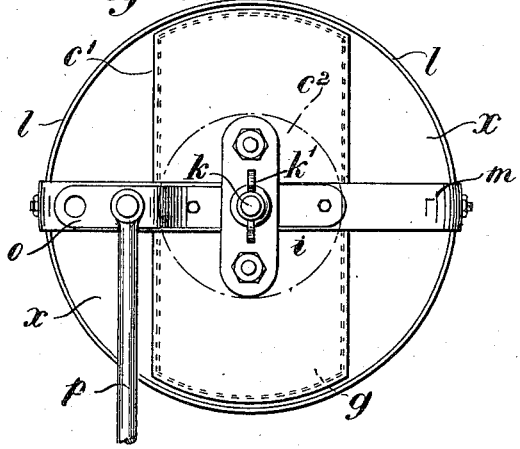

UNITED STATES PATENT OFFICE.

GEORGE CLEMENT BROWNLESS, OF DARLINGTON, ENGLAND.

MEASURING-MACHINE.

1,032,736.

Specification of Letters Patent. Patented July 16, 1912.

Application filed July 2, 1910. Serial No. 570,085.

*To all whom it may concern:*

Be it known that I, GEORGE CLEMENT BROWNLESS, of 35 Marshall street, Darlington, England, wholesale grocer's foreman, have invented an Improved Measuring-Machine; and I do hereby declare that the following is a full, clear, and exact description of the same, reference being had to the accompanying drawings, forming a part hereof.

This invention relates to automatic measuring and filling machines in and through which various materials may be accurately measured and rapidly filled into packages, and in which the effective size of the measuring box is regulated by an adjustable block.

My invention consists in the novel construction and combination of various parts of the machine, as hereinafter set forth. And in order that the same may be fully understood and readily carried into effect I will describe the machine, with reference to the accompanying drawings and figures and letters of reference marked thereon, that is to say:—

Figure 1 is a front elevational view of the machine constructed in accordance with this invention. Fig. 2 is an end elevational view of the same. Figs. 3 and $3^a$ are respectively end and side elevational views of the block $g$. Fig. 4 is a side view of the square frame. Fig. 5 is a front view of the square frame. Figs. 6 and $6^a$ are respectively sectional elevation along the line A—A in Fig. $6^a$ and plan of a sleeve arranged around the inlet funnel. Figs. 7 and $7^a$ are respectively side elevation and end elevation to a larger scale showing the internal arrangements of the machine and the manner of actuating the block $g$ to adjust the capacity of the measuring box, portion of the casing and measuring chamber being broken away in Fig. 7. Fig. 8 is an edge view of the band in a position to open the inlet and close the outlet. Fig. 9 is a side view of Fig. 8. Fig. 10 is a view similar to Fig. 8, with the band in a position to close the inlet and open the outlet. Fig. 11 is a view of Fig. 10, similar to Fig. 9.

Similar letters of reference indicate like parts in each of the figures.

Referring to the drawings by numerals it will be seen that the improved machine comprises support $a$ to which there is secured an angled arm $b$ at the end of which there is casing $c$ secured by means of the bolt $b'$ shown in Fig. 1 or by any other suitable means.

The casing is substantially drum shaped and is provided at its upper side with an inlet $c^3$ in which there is placed a hopper $e$ which contains the material to be measured. The material is fed to the hopper $e$ either by hand or by any other suitable means. A discharge funnel $f$ is secured to the lower portion of the casing. This casing and support are very similar to those commonly used in coffee mills with the exception that the casing is provided with a large circular opening $c^2$ formed in one end, the purpose of which will be brought out farther on.

A substantially rectangular measuring chamber $c'$ is fitted within the casing $c$ and is provided with curved top and bottom which are provided with inlet and outlet openings 1 and 2 respectively which register with the inlet and outlet openings of the casing $c$. A threaded bolt $n$ is secured to the side wall of the measuring chamber and the chamber suspended within the casing by passing the bolt through the side of the casing and secured by means of a nut $n'$ or other suitable means.

One end of the chamber is left open and is closed by means of a block $g$ fitted within the casing. A pair of rods H—H are secured to the block $g$ and extend through the opening $c^2$ and have their outer ends connected by a link $i$ in the center of which there is rotatably mounted a thumb-nut $k'$.

A rectangular frame $m$ is pivotally mounted upon the bolt $n$ and surrounds the measuring chamber. A threaded bolt $k$ is rotatably secured to the opposite end of the frame from the bolt $n$ and extends through the opening $c^2$ to be engaged by the thumb screw $k'$. By turning the screw $k'$ the block $g$ is moved within the measuring chamber and increases or diminishes its capacity according to the direction in which the thumb screw is turned.

A circular perforated band $l$ of suitable material is placed around the chamber $c'$ and is secured at opposite points to the frame $m$ and has its intermediate portions engaged by the top and bottom of the chamber. The perforations of the band are positioned so that each perforation is disposed opposite an unperforated portion of the band and is of the same size as the inlet and outlet to the measuring chamber.

In order that there should be no danger of the material not entering the inlet there is provided a sleeve $r$ which fits the inlet of the casing and which is provided with a flange $r'$ which rests upon the upper portion of the band and fits the contour of the top of the measuring chamber. As the material to be measured passes through the hopper it goes through the sleeve $r$ and into the measuring chamber and there is no possibility of its escaping.

When the block $g$ is moved to reduce the capacity of the chamber $c'$ it also passes beyond the edges of the inlet and outlet and thus makes them smaller so that a common means is used for regulating the size of the openings and capacity of the chamber and there is no danger of the inlet and outlet not being correspondingly open when the chamber is enlarged to its fullest capacity.

The device is operated by a rod $p$ which is connected with the frame $m$ by means of an arm $o$ which is passed through the opening $c^2$ and causes the frame to oscillate when the rod is moved. By means of this construction, the inlet is opened and the outlet closed and the chamber fills with material from the hopper. The rod is then moved by any desired means, and the inlet closes and the outlet opens and the contents of the chamber passes through the funnel $f$ into a suitable receptacle.

It should be noted that the outlet opening 2 is larger than the inlet 1 as shown in Fig. 7 so that the material will be passed out very readily.

What I claim as my invention and desire to receive by Letters Patent is:—

1. A measuring machine comprising a casing, a measuring chamber within said casing and provided with an inlet and an outlet, means for regulating the capacity of said chamber, a rotatably mounted band surrounding said measuring chamber, and provided with openings adapted to be brought into registry with said inlet and outlet when the band is rotated whereby said inlet and outlet will be alternately opened.

2. A measuring machine comprising a casing, a measuring chamber provided with inlet and outlet openings, a block movably mounted within said chamber to regulate the size of said openings, and the capacity of said chamber and a revoluble band surrounding said measuring chamber and alternatingly opening and closing said inlet and outlet.

3. A measuring machine comprising a casing, a measuring chamber mounted within said casing and provided with inlet and outlet openings, common means regulating the size of said openings and the capacity of said chamber, a perforated band opening and closing said openings, a frame secured to said band and means revolving said frame.

4. A measuring machine comprising a casing, a measuring chamber provided with inlet and outlet openings, an adjusting block within said chamber, rods secured to said block, a threaded rod, a bar mounted upon said threaded rod and secured to said rods, and means for alternately opening and closing said inlet and outlet openings.

5. A measuring machine comprising a casing provided with a central opening in one end, a measuring chamber within said casing, a perforated band surrounding said chamber, a frame secured to said band, an arm secured to said frame and extending through said opening, and means connected with said arm for rotating said frame and band.

6. A measuring machine comprising a casing, a measuring chamber within said casing, having an inlet and an outlet, means for regulating the capacity of said chamber, a frame surrounding said chamber, a perforated band carried by said frame and passing over said inlet and outlet, and means for oscillating said frame to bring the perforations of said band alternately into registry with said inlet and outlet to alternately open the same.

In testimony whereof I affix my signature in presence of two witnesses.

GEORGE CLEMENT BROWNLESS.

Witnesses:
MATTHEW JAMES WILSON,
MATTHEW HENRY WATSON.

---

Copies of this patent may be obtained for five cents each, by addressing the "Commissioner of Patents, Washington, D. C."